United States Patent [19]

Pollack

[11] Patent Number: 5,081,593
[45] Date of Patent: Jan. 14, 1992

[54] METHOD AND APPARATUS FOR MONITORING AND CONTROLLING LINEAR MOTOR ROBOT APPARATUS AND THE LIKE

[75] Inventor: Steven H. Pollack, Washington Crossing, Pa.

[73] Assignee: Megamation Incorporated, Lawrenceville, N.J.

[21] Appl. No.: 394,622

[22] Filed: Aug. 16, 1989

[51] Int. Cl.$^5$ ............................................. G05B 19/407
[52] U.S. Cl. ................................. 395/88; 318/568.16; 318/568.24; 901/49; 395/90
[58] Field of Search ................................ 364/513, 900; 318/568.16, 568.18, 568.24, 687, 568, 662; 310/12

[56] References Cited

U.S. PATENT DOCUMENTS

| | | | |
|---|---|---|---|
| 3,851,196 | 11/1974 | Hinds | 310/12 |
| 3,886,383 | 5/1975 | Ross et al. | 310/12 |
| 3,904,897 | 9/1975 | Shichida et al. | 310/12 |
| 4,132,938 | 2/1979 | Sano et al. | 318/568 |
| 4,161,787 | 7/1979 | Groves et al. | 364/900 |
| 4,161,787 | 7/1989 | Groves et al. | 364/900 |
| 4,187,454 | 2/1980 | Ito et al. | 318/568 |
| 4,187,454 | 2/1980 | Ito et al. | 318/568 |
| 4,667,697 | 5/1987 | Udegawa et al. | 294/86.4 |
| 4,706,007 | 11/1987 | Nagasaka | 318/687 |
| 4,718,078 | 1/1988 | Bleidorn et al. | 318/568 |
| 4,823,062 | 4/1989 | Hoffman et al. | 318/687 |
| 4,835,424 | 5/1989 | Hoffman et al. | 310/12 |
| 4,890,241 | 12/1989 | Hoffman et al. | 364/513 |
| 4,958,115 | 9/1990 | Miller | 318/662 |

FOREIGN PATENT DOCUMENTS

| | | | |
|---|---|---|---|
| 62-24305 | 7/1985 | Japan | 318/568.24 |
| 133605 | 7/1987 | Japan | 318/568.24 |
| 1405023 | 4/1985 | U.S.S.R. | 318/568.16 |

OTHER PUBLICATIONS

Lammineur, P., and Cornillie, O.: *Industrial Robots*, 1984, pp. 8-9.

Primary Examiner—Allen R. MacDonald
Assistant Examiner—Roger S. Joyner
Attorney, Agent, or Firm—Louis Weinstein

[57] ABSTRACT

A technique for preventing a stalled linear motor device from damage including monitoring accelerometer servos which generate signals representative of the difference between a command acceleration signal controlling the linear motor and the actual acceleration experienced by the linear motor device which signal represents the acceleration error and the direction of the error. The different signal is compared against programmed limits to develop a break-loose signal when the programmed limit (positive or negative) is exceeded. The break-loose signal is monitored as to duration, which duration is preprogrammed according to the dynamics of the system specifications presently in use. In the event that the break-loose signal exceeds the preprogrammed time limit, a latch is set, generating an interrupt signal applied to the computer control which immediately removes all motive power from the system and tests the latch to determine the source of the error, the latch remaining in the set state awaiting the computer test and being reset only after recognition by the computer.

24 Claims, 3 Drawing Sheets

METHOD AND APPARATUS FOR MONITORING AND CONTROLLING LINEAR MOTOR ROBOT APPARATUS AND THE LIKE

FIELD OF THE INVENTION

The present invention relates to robot systems and the like, and more particularly, to a novel preprogrammable monitoring technique for preventing robots driven by linear motors as well as the other components of the robot system, from being damaged due to stalling.

BACKGROUND OF THE INVENTION

Linear motors are extremely advantageous for use as a means for moving or driving a device, such as, for example, a robot.

A linear stepping motor (much like a rotary stepping motor) is caused to move by advancing magnetic fields developed within the linear stepping motor forcer in order to develop relative motion with respect to its stator which, in the example given, is maintained stationary. A linear stepping motor is a synchronous machine since its advancing fields must very closely track its actual motion. If the fields lose synchronism with the actual motion, the motor stalls and develops no torque or force.

Without positive feedback by way of an encoder or other position tracking device, the position control of the linear motor is open-loop. Similarly, in xy linear motors, which are capable of moving in mutually perpendicular directions along a surface, such as the platen surface, the position control of an xy motor is also open-loop in the absence of position feedback or other position tracking devices.

The absence of direct position feedback allows the possibility of errors due to:

Stall, i.e. the loss of motor force due to the loss of electromagnetic synchronization with the etched pattern of the platen. This condition or stall can occur during:

(a) acceleration, when the mass of the device driven by the linear motor cannot keep up with the advancing electromagnetic wave, (b) deceleration, when the inertia of the device driven by the linear motor cannot be stopped by the electromagnetic wave, (c) collision, when the device driven by the linear motor strikes an object in the workspace, causing a stall.

A stall can cause the device driven by the linear motor to slide along the platen in an uncontrolled fashion where subsequent collisions can occur with other objects in the workspace, other devices driven by their linear motors along the platen, or with the edge boundaries of the platen. A stall also allows the possibility of the device driven by the linear motor realigning itself with the platen grid at a totally unknown position or in an unknown orientation where the direction of motion is now unknown. If the device driven by the linear motor is realigned in an unknown orientation, the next commanded move given to such device causes a collision or stall to occur.

A stall causes the xy linear motor position on the platen to be unknown, thereby rendering the control apparatus useless in determining and protecting against collisions.

The linear motors described hereinabove have been used to great advantage in multi-robot systems, such as, for example, the system described in copending application Ser. No. 112,534, filed Oct. 26, 1987, now U.S. Pat. No. 4,890,241, issued Dec. 26, 1989 and assigned to the assignee of the present invention, which application is incorporated herein by reference thereto. Although a detailed description of the robot system is described in the aforementioned copending application, it is sufficient to understand that the robot system of U.S. Pat. No. 4,890,241 is comprised of a plurality of robot devices, each having a two-dimensional (i.e. xy) linear motor, typically referred to as an xy forcer capable of generating electromagnetic fields in mutually perpendicular directions, which fields develop eddy currents in a platen cooperating with the xy forcers. The platen is mounted in a stationary fashion so that the relative motion between the platen and the multiple robots cause the robots to move across the platen. The motion control system employed to move the robot in the x and y directions consists of a main controller and motor drive electronics. The main controller outputs are comprised of motor step pulses and motor direction signals for each of the x and y forcers. The motor drive electronics converts the step pulses and motor direction signals into analog voltages required to drive the power amplifiers, which in turn drive the coil windings of the linear xy motor. Suitable xy linear motors for this purpose are produced by Xynetics of Santa Clara, Calif.

A stall can cause the moving robot arm to slide along the platen in an uncontrolled fashion wherein subsequent collisions can occur with other objects in the workspace, other robot arms on the platen or with the edge boundaries of the platen. A stall can also allow the possibility of the robot arm realigning itself with the platen grid at a totally unknown position or in an unknown orientation where the direction of motion is now unknown. If realigned in an unknown orientation, the next commanded move given to a robot arm can cause a collision or a stall to occur.

A stall causes the xy motor position on the platen to be unknown thereby rendering useless the system control software, for example, the anti-collision software described in copending application Ser. No. 387,222, filed July 28, 1989 and assigned to the assignee of the present application.

It thus becomes necessary to provide means for preventing a robot system from being damaged due to a stall condition.

BRIEF DESCRIPTION OF THE INVENTION

The present invention is characterized by comprising a damping control servo system forming part of the motor drive electronics to provide improved performance. The damping servo system is implemented using feedback from a set of accelerometers located in the robot arm adjacent to the xy linear motor. By monitoring the expected (or demanded) acceleration requested by the motor controller and the actual acceleration measured by the accelerometers in the xy linear motor, the motor drive electronics can correct for acceleration errors of the two-dimensional linear motor as it moves from point to point.

More specifically, the robot, or other moving device, is provided with an accelerometer for generating a signal representing the magnitude and direction of acceleration. The actual acceleration (magnitude and direction) is compared against the commanded signal to provide a difference signal. The difference signal is amplified and compared against safe limits which may be preprogrammed to take into account the dynamics of the system specifications presently abiding. In the event that the difference signals falls outside of the preprogrammed safe limits, a "break-loose" signal is generated. This break-loose signal is monitored for its duration which may be anywhere from one to several hundred milliseconds. The duration of the break-loose signal is monitored by a pulse width discriminator which can be preprogrammed to allow minimum pulse widths of from one to a maximum of 255 milliseconds, for example, before generating a break-loose interrupt condition. Assuming that the break-loose signal persists for the minimum preset period, the discriminator generates a signal which sets a latch. The latch generates a system emergency signal and remains in the set state until examined by the system computer. The system emergency signal immediately shuts off the xy linear motor air bearings and all AC power to the moving systems to prevent the linear motor driven robots from being damaged as well as from damaging other robots and objects located in the workspace.

The latch remains in the set state until reset by the computer, which examines the latches of all of the break-loose circuits to determine the precise source of the break-loose condition.

A monitoring device is provided for each robot arm employed in the multi-robot system.

OBJECTS OF THE INVENTION

It is, therefore, one object of the present invention to provide a novel system for detecting stalled linear motors.

Still another object of the present invention is to provide method and apparatus for preventing systems having stalled linear motors from being damaged or from damaging other moving or stationary objects within the system due to a stalled condition.

Still another object of the present invention is to provide a novel method and apparatus for monitoring linear motors to detect the occurrence of a stalled condition comprising means for adjustably setting the limits for determining a stall wherein said limits may include at least one of the differences between a commanded acceleration signal and the actual acceleration signal of a linear motor and the duration of the difference signal falling outside of the safe limits.

Still another object of the present invention is to provide a novel method for determining a stalled condition including the steps of measuring the actual acceleration of a device driven by a linear motor; determining the difference between the actual acceleration and the commanded acceleration; determining whether said difference signal lies outside a predetermined safe range; determining the duration of a difference signal lying outside of the safe limits and generating a system emergency signal in the event that an unsafe difference signal persists for a predetermined time, said predetermined time being adjustably set according to system parameters for the particular job.

Still another object of the present invention is to provide a novel method for immediately decoupling motive power from linear motors when a predetermined acceleration condition exists for a predetermined time interval to protect the system components from damage.

BRIEF DESCRIPTION OF THE FIGURES

The above, as well as other objects of the present invention will become apparent from reading the accompanying description of the drawings, in which.

DETAILED DESCRIPTION OF THE INVENTION AND PREFERRED EMBODIMENTS THEREOF

Figure 1:
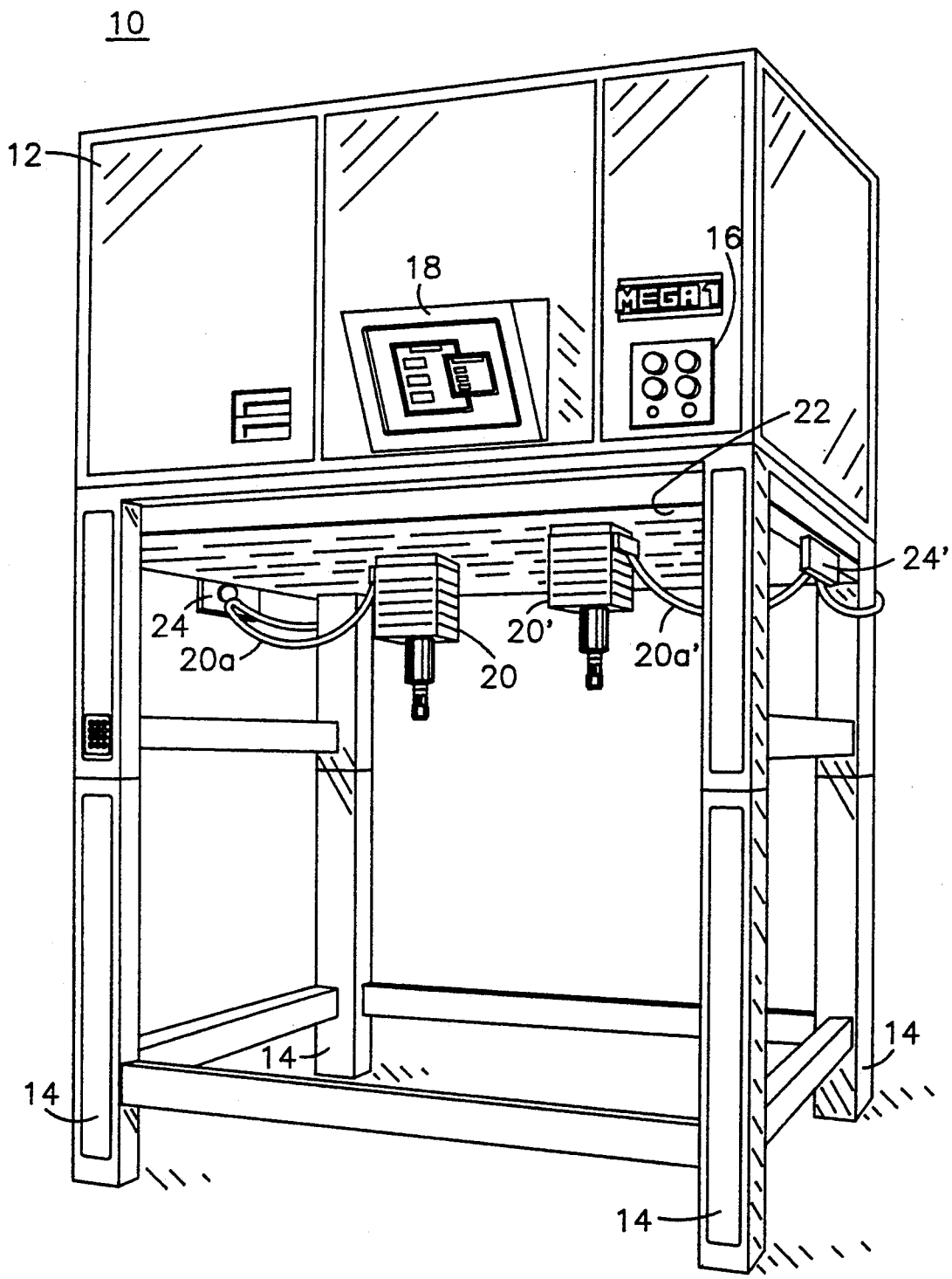
FIG. 1 shows a multi-robot system.

FIG. 1 shows a multiple robot system 10 embodying the principles of the present invention and comprised of a housing 12 mounted upon supports 14 and containing the control cabinet for the system electronics. An array of operating buttons 16 and touchscreen 18, also employed for control purposes as well as for display, are arranged along the exterior of the control cabinet 12.

System 10 is of the overhead system type in which a conveyor (not shown) or other form of worksurface extends through or may be moved through the open region defined by the supports 14 in order to align workpieces on a worksurface arranged beneath the robots 20, 20'. Only two robot arms are shown for purposes of simplicity, it being understood that a greater or even lesser number may be used and operated simultaneously in system 10. The robots are connected to the control circuitry by an umbilical cord 20a, 20a'. The robots are powered by electromagnets contained within the robot housing and are attracted to an upper plate 22, referred to as a platen, by permanent magnets. The robots slide along platen 22 on a layer of compressed air. Power, in the form of electricity and compressed air is transmitted to each robot arm from the electronic system and control cabinet 12 by means of umbilical cords 20a, 20a' attached to the machine frame at 24, 24'. The robots each include xy forcers, i.e. two-dimensional linear motors, capable of moving the robot in mutually perpendicular directions along the overhead platen 22 by motor drive pulses commanded by the system controller and may be of the type described in application Ser. No. 112,534, filed Oct. 26, 1987 now U.S. Pat. No. 4,890,241, issued Dec. 26, 1989 and assigned to the assignee of the present application, said U.S. patent application being incorporated herein by reference thereto.

The motor control system employed to move each robot 20, 20' in the directions of the x and y axes is comprised of a main controller and motor drive electronics. The main controller outputs are motor step pulses and motor direction signals for each linear motor respectively driving the robot arm in the x and y direction. The motor drive electronics converts the step pulses and motor direction signals into analog voltages required to drive the power amplifiers which, in turn, drive the coil windings of the 2-axis linear xy motor. These devices are conventional and may be obtained, for example, from Xynetics of Santa Clara, Calif.

The linear stepping motors are synchronous machines in which the advancing fields must very closely track actual motion. If the fields lose synchronism with the actual motion, the motor stalls and develops no torque or force.

In the absence of position feedback by way of an encoder or other position tracking device, the position control of the xy motor is open-loop. The absence of direction and position feedback allows the possibility of errors due to the loss of motor force due to a loss of electromagnetic synchronization with the etched pattern of the platen, typically referred to as a stall, which condition can occur as a result of either the failure of the mass of the robot arm to keep up with advancing electromagnetic waves during acceleration, the failure of a robot arm to be stopped by the electromagnetic wave due to the inability of the electromagnetic wave to overcome the inertia of the robot arm or a collision which may be caused when a robot arm strikes an object in the workplace.

A stall can cause an arm to slide along the platen in an uncontrolled fashion enabling the potential for subsequent collisions with other objects in the workspace, other arms on the platen or with the edge boundaries of the platen.

A stall also permits the possibility of the arm realigning itself with the platen grid at a totally unknown position or in an unknown orientation wherein the direction of motion is now unknown. If realigned in an unknown orientation, the next commanded move given to the arm may result in a collision or stall.

A stall causes the xy motor position on the platen to be unknown thereby rendering anti-collision techniques useless.

The present invention, in order to provide increased xy performance, utilizes a damping control servo system as part of the motor drive electronics. The damping servo system is implemented by using feedback from a set of accelerometers located in the robot arm. By monitoring the expected (or commanded) acceleration requested by the motor controller and the actual acceleration measured by the accelerometers in the xy motor, the motor drive electronics can correct for acceleration errors of the motor as it moves from point to point. The system also automatically adapts itself according to the conditions of the job, which conditions may change from job to job.

The present invention provides a novel break-loose control circuit which monitors xy motor performance and is capable of detecting an xy motor stall (break-loose) condition to immediately generate a high level system emergency interrupt signal which immediately shuts off the xy motor air bearing and all AC power to all moving assemblies within the system 10 to protect the system from damage.

The break-loose circuit is housed within the control cabinet 12 and a motion tracker circuit is installed within each robot arm.

Figure 2:
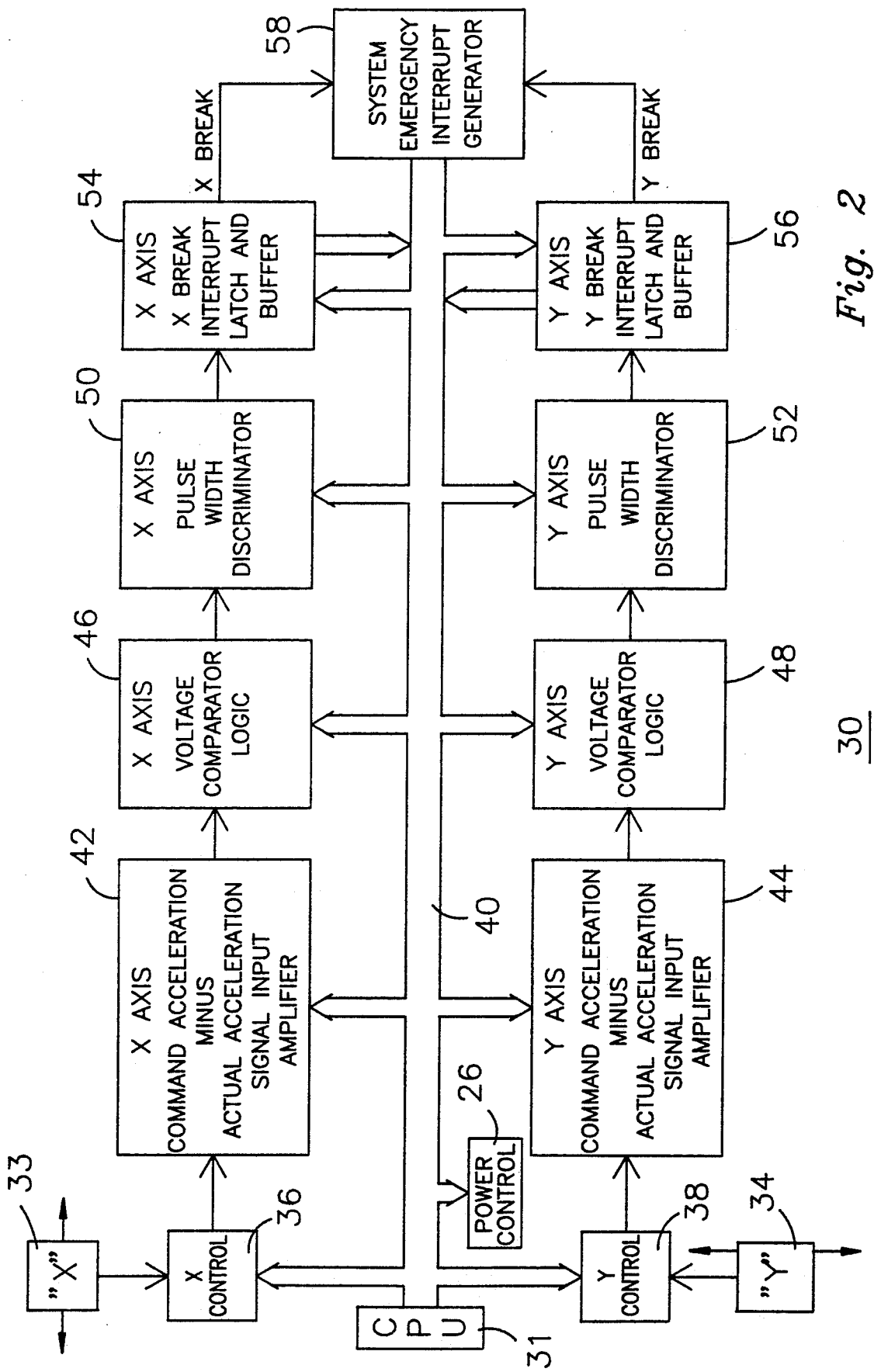
FIG. 2 shows a simplified block diagram of a control means for monitoring the robots of FIG. 1 and which has been designed in accordance with the, principles of the present invention.

Making reference to FIG. 2, the break-loose circuit 30 takes advantage of two signals generated by the accelerometer servo systems present in the motor drive electronics module.

Each robot 20, 20', for example, shown in FIG. 1, is provided with accelerometers 33 and 34 for detecting acceleration respectively in the x and y directions. The accelerometers generate signals representative of the magnitude and direction of acceleration. A difference circuit 36, 38 for the respective x and y directions compare the actual acceleration measured by the accelerometers 32 and 34 with the commanded acceleration values developed by the CPU 31 which applies the command values to difference circuits through a bus 40. The two signals developed by the difference circuits 36 and 38 and referred to as Xcontrol and Ycontrol indicate, by amplitude, the difference between the command acceleration and the actual acceleration for the x and y axes. The Xcontrol and Ycontrol signals are dual voltage signals ranging in amplitude from $-15$ to $+15$ volts. The negative component of the Xcontrol signal quantifies the acceleration error in the $-X$ direction and conversely, the positive component of the Xcontrol signal quantifies acceleration error in the $+X$ direction. The same relationship holds true for the Ycontrol signal.

The input of the Xcontrol and Ycontrol signals from the difference circuits 36 and 38 is buffered and scaled by an X axis input amplifier and a Y axis input amplifier 42 and 44, respectively. Amplifiers 42 and 44 are high impedance buffers designed to minimize the effect of connecting to signals in the motor drive electronics module. Amplifiers 42 and 44 scale the input amplitude of the Xcontrol and Ycontrol signals to an amplitude range compatible with the comparator logic of the break-loose detection circuitry 30.

The scaled Xcontrol and Ycontrol signals are checked by the X axis and Y axis voltage comparator logic forming part of the break-loose circuitry to insure that the signal amplitude falls within the programmed safe limits. The amplitudes of the Xcontrol and Ycontrol signals represents the quantity of acceleration error. The signal voltage comparator logic is programmed, by way of voltage limits, to detect motor acceleration errors which exceed the voltage limits set which voltage limits are controlled by the preprogrammed computer system and applied to control the comparator logic by way of CPU 31 coupled to the X and Y axis voltage comparator logic by bus 40, according to the parameters of the particular job.

The voltage comparator logic consists of four sections:

(1) Positive voltage limit is programmable between zero and plus ten ($+10$) volts by CPU 31 from the bus interface 40. The voltage limit value program determines what quantity of acceleration error, in the positive direction, will signify a stall or break-loose condition.

(2) Negative voltage limit is programmable between zero and minus ten ($-10$) volts by computer control from the bus interface 40. The voltage limit value program determines what quantity of acceleration error, in the negative direction, will signify a stall or break-loose condition.

(3) Positive voltage comparators are provided for each of the scaled Xcontrol and Ycontrol signals. The comparator outputs of the logic circuits 46 and 48 are triggered when the input signals from the associated amplifiers 42 and 44 are more positive than the programmed positive voltage limit. The positive voltage comparator is looking for an acceleration error greater than the amount allowed as determined by the positive voltage limit circuit. The positive limits are the same for both the x and y comparators.

(4) Negative voltage comparators are provided for each of the scaled Xcontrol and Ycontrol signals. These comparator outputs are triggered if the input signals are more negative than the negative voltage limit program. The negative voltage comparator continually looks for an acceleration error greater than the amount allowed as determined by the negative voltage limit circuit. The negative limits are the same for both the x and y comparators.

The values programmed into the positive and negative voltage limits vary according to the acceleration profiles set for the XY motor, and the size of the arm payload mounted on the arm flange. The programmability of the voltage limits allows the system to vary the break-loose circuit sensitivity according to the changing dynamics of the arm acceleration, speed and payload. The ability to change the break-loose circuit parameters is important when the dynamics of the motion of the robot arm can change from operation to operation within the job. For example, an arm moving with a heavier tool reacts more slowly to acceleration than an arm having a lighter tool or no tool at all, thus necessitating the setting of reduced limiting values in order to properly monitor the heavier robot arm, for example.

The X and Y axes pulse width discriminators 50 and 52 determine the minimum duration, in milliseconds, of the X and Y break-loose signal generated by the X and Y axis comparator logic circuits which generate a break-loose interrupt signal. Each pulse width discriminator can be programmed to allow minimum pulse widths from one to 255 milliseconds, for example, before generating a break-loose interrupt signal.

Each pulse width discriminator serves essentially as a "filter" which bypasses (i.e. ignores) outputs of the voltage comparator logic that are not actual break-loose related errors. The pulse width discriminator is necessary to distinguish, under varying motion dynamics, a real stall (or break-loose) condition as opposed to conditions due to noise induced by mechanical coupling with another axis on the robot arm or expected initial acceleration errors resulting from high acceleration profiles.

The value programmed into the pulse width discriminator by way of CPU 31 and bus 40 will vary according to the acceleration profiles set for the XY motor, the size of the robot arm payload and the mechanical coupling characteristic of the gripper or tool mechanics mounted upon the robot arm flange. The programmability of each discriminator allows the controller to vary the break-loose circuit sensitivity according to the changing dynamics of the arm acceleration speed and payload. The ability to change the break-loose circuit parameters is important since the dynamics of the motion of the robot arm can change significantly from operation to operation within the job.

X and Y axes break interrupt latches 54 and 56 are coupled to the outputs of the discriminators 50 and 52, respectively and are set when triggered by a valid signal from their associated pulse width discriminator. The interrupt latches remain active even though the trigger signal may disappear until the controller responds to the system emergency interrupt. More specifically, CPU 31 receives a very high priority interrupt signal and responds to this emergency break-loose interrupt by turning off moving power and turning off all robot air bearings. After the moving components of the system are halted by the emergency condition and the robots are locked in place against the platen, due to the permanent magnet of each linear motor which is attracted to the platen, the interrupt latches are reset and reactivated in readiness to detect future break-loose conditions. The X and Y break interrupt buffers 54 and 56 include latches which enable the system to determine the specific source of the break-loose error condition.

The system emergency interrupt generator 58 is responsible for detecting the occurrence of a X or Y break-loose signal from the interrupt latches and driving the active system emergency interrupt signal on bus 40. The system emergency interrupt signal triggers a high level hardware interrupt in the controller hardware logic.

A simplified break-loose example, making reference to FIG. 2, as well as the detailed arrangement shown in FIG. 3, will now be described.

The requested move will be in the +X direction for a distance of twelve inches. At a distance of six inches into the move, robot arm 20 collides with an obstacle, stalls and begins to slide out-of-control.

Initially, the break-loose circuit 30 has been set to an 11.5 positive voltage limit, an 11.5 negative voltage limit, and a 40 millisecond minimum pulse width discriminator value. This is accomplished by applying an analog representation of the analog to digital converter circuitry 60 which receives a digital representation of each analog voltage value at its input WD0 through WD7 together with control signals for selecting one of the digital to analog converters 60a or 60b. Analog converter 60a couples the negative window value of −11.5 volts through operational amplifier 60c to the negative window reference inputs of the X axis and Y axis comparator logic and specifically the non-inverting inputs of comparators 60e and 60g. In a similar fashion, digital to analog converter 60b applies, through operational amplifier 60d, the positive window limits of +11.5 volts to the inverting inputs of comparator 60f and 60h.

CPU 31 further applies a binary word at the inputs WD8 through WD15, as well as a control signal to input DACA/ (through inverter U7) to a control circuit 62 forming part of the pulse width discriminator circuits 50 and 52 for respectively applying binary control signals to first and second counters 64 and 66 each comprised of counter stages 64a, 64b and 66a, 66b respectively. The binary control signals applied to the two-stage counters 64 and 66 determine the number of clock pulses, i.e. the number of milliseconds which counters 64 and 66 will count before detecting the presence of a persistent break-loose condition of a predetermined minimum time interval. Clock pulses are applied to the clock input terminals of each of the counter stages from a master clock (MCLK), typically forming part of the CPU. For purposes of the present example, a 40 millisecond minimum pulse width discriminator value has been set into counters 64 and 66.

The system analyzes the move request for access limit violations and anti-collision violations. The anti-collision technique is one in which determination is made of the requested move to assure that performance of the move will not result in a collision. This collision detect technique is described in detail in copending application Ser. No. 387,222, filed July 28, 1989 and assigned to the assignee of the present invention. If a potential collision condition is detected, the move request will be denied.

Assuming that the collision detect indicates that the move may be performed without collision, the move is initiated and the XY motor controller sets the command acceleration value which is applied to both the robot linear motors for XY drive and to the XY difference circuits 36 and 38. The difference circuitry develops an acceleration error signal (the difference between the command value and the actual acceleration determined by the accelerometer), identified in FIG. 3 as the Xcontrol and the Ycontrol signals which are applied to the amplifiers 68 and 70 shown in block diagram form as 42 and 44 in FIG. 2.

During the initial part of the acceleration period, the Xcontrol signal indicates no errors and is well within the voltage limits set for the voltage comparator logic. This is determined by the Xcontrol signal which is applied to comparators 60e and 60f to be respectively compared against the negative and positive window values respectively applied to the non-inverting and inverting inputs of comparators 60e and 60f.

After moving six inches, the robot experiences a sudden deceleration caused by a collision. This condition is detected by the XY motor accelerometers 32 and 34 applying maximum amplitude acceleration error signal of +15 volts to the Xcontrol signal circuit, for example. The voltage comparator logic detects the +15 volt Xcontrol signal which has exceeded the preprogrammed +11.5 volt limit and issues an active break indication from comparator 60f through ORgate 60i.

The X axis pulse width discriminator 64, upon receiving the active break indication from the X axis comparator logic, starts timing the duration of the active break signal, developing a count of the clock pulses applied to the clock pulse input. Due to the programmed setting of counter 64 by CPU 31, when the counter reaches a count of 40 milliseconds and the break signal XBREAK is still active, then an active signal is sent to the XBREAK interrupt latch 68 which may, for example, be a D-type flip-flop. Latch 68 is set active, thereby locking active the break condition even if the active signal from the pulse width discriminator 64 later becomes inactive.

The system emergency interrupt generator comprising an ORgate 72 and inverter 74, receives an active XBREAK signal and generates a system emergency interrupt applied to the system bus 40.

The system bus hardware interrupt causes the CPU 31 to stop its current task and immediately execute a program task which shuts down all moving power and shuts down the air bearing of each arm. The power control circuit 76 is coupled to CPU 31 through bus 40, as shown for example, in FIG. 2. The permanent magnet in each robot "locks" the robot to the platen.

CPU 31 accesses the interrupt buffer in each robot arm to determine which one has caused the break-loose emergency interrupt. An error message is developed on the touchscreen display 18 (FIG. 1) to identify the arm which caused the break-loose emergency interrupt.

Thereafter, the X and Y axes break interrupt latches are reset to clear the break-loose error. The system remains idle until a qualified operator issues the appropriate command to restart moving power and to home the robot arms.

Summarizing, the break-loose detection circuit of the present invention provides a safety and control characteristic for each robot arm which is unique to the system of FIG. 1 and which sets the system far apart from other conventional two axis linear motor implementations. The importance of the break-loose technique in the implementation of two axis linear motors in the robot system of FIG. 1 include the following:

1. positional accuracy—the system guarantees the positional accuracy of each robot arm within the system workspace.
2. machine safety—the break-loose technique provides a safety feature which protects all of the robot arms in the workspace as well as any customer devices located within the workspace.
3. employee safety—the break-loose technique provides a safety feature which protects employees from serious harm due to collision with a moving robot arm.
4. the technique provides assurance that each robot arm is always in the physical position in the workspace that the controller expects.
5. the programmability of the system permits adjustment to accommodate the dynamics of the break-loose circuit to the varying dynamics of the robot arm motion parameter which include changes in robot arm acceleration and payload in the performance of job tasks within the workspace.

Figure 3:
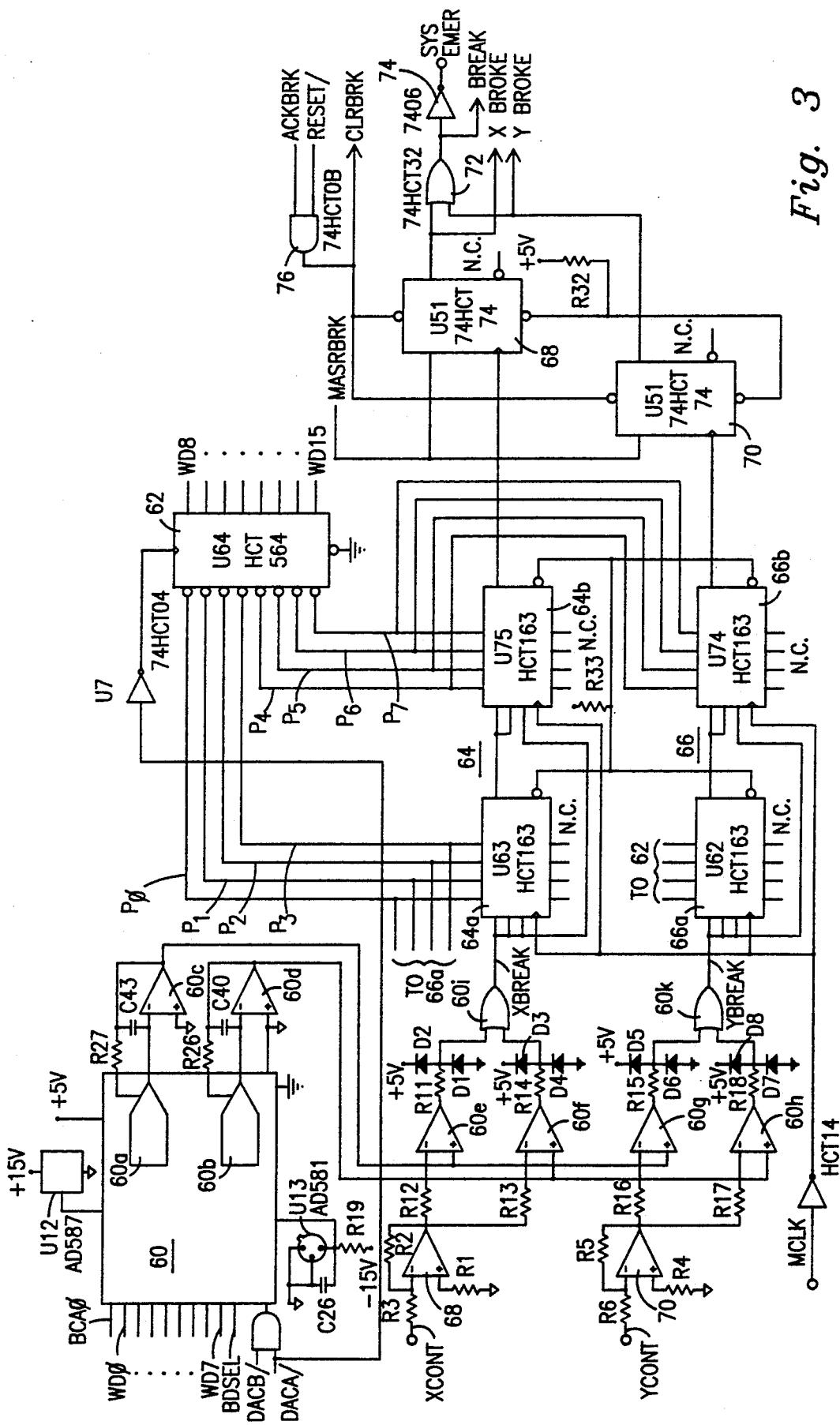
FIG. 3 show a detailed block diagram of the control system of FIG. 2.

The components employed in the circuit shown in FIG. 2 and FIG. 3 may, for example, be the following:

| CIRCUIT | MODEL/TYPE | MANUFACTURER |
| --- | --- | --- |
| 60 | AD7528 AD587 AD581 | Analog Devices |
| 68, 70 | LM741 | National Semiconductor |
| 60e, 60f, 60g, 60h | LM148 | National Semiconductor |
| 60i, 60k, 72, | 74LS532 | Texas Instruments |
| 64a, 64b, 64c, 64d | HCT163 | RCA |
| 62 | HCT564 | RCA |
| 68, 70 | 74HCT74 | RCA |
| 74 | 74OG | RCA |
| 76 | 74HCTOB | RCA |
| 33, 34 | Accelerometer | Xynetics |
| 36, 38 | Difference Circuit | Xynetics |
| 31 | CPU 68020 | Motorola |

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. Apparatus for identifying a break-loose condition in a robotic system comprised of:

a stator surface;

at least one robot movable within a predetermined workspace along said stator surface responsive to motor step pulses and direction signals;

means for controlling the movement of said robot according to a predetermined command value;

acceleration detection means provided on said robot and movable therewith for generating a signal representing the acceleration of said robot in a predetermined linear direction;

difference means for generating a difference value representing the difference between the command value and the acceleration signal representing the actual acceleration sensed by said acceleration detection means;

means for comparing said difference value with a predetermined threshold level representing a safe linear acceleration limit, said comparison means including means for generating a break-loose signal when said threshold level has been exceeded;

means for timing the duration of said break-loose signal including means for generating a system break-loose emergency signal when said break-loose signal has persisted for a predetermined time interval.

2. The apparatus of claim 1 further comprising:
means responsive to a break-loose emergency signal for removing all driving power from the robots in the system.

3. The apparatus of claim 2 further comprising means for storing the threshold level applied to said comparator means, said threshold level being a value which is related to the weight of the robot.

4. The apparatus of claim 1 further comprising means for storing the time interval of said timing means which is related to an actual break-loose condition of the robot.

5. The apparatus of claim 1 further comprising latch means normally maintained in a reset state and being driven to a set state by said system break-loose emergency signal for maintaining said set state indefinitely independently of the continued persistence of the break-loose signal.

6. The apparatus of claim 5 further comprising:
means responsive to said set state for halting movement of all of said robots; and
further including means for resetting said latch means to said reset state.

7. The apparatus of claim 1 further comprising:
comparator means having a first input for receiving said difference value and a second input for receiving said threshold level;
means for generating a reference level related to the command value for moving the associated robot, said reference level being in digital form;
digital to analog converter means for converting the reference level in digital form to an analog form signal which is applied to said comparator.

8. The apparatus of claim 1 wherein said timing means comprises:
clock means;
means responsive to said clock means and to the presence of a break-loose signal for counting clock pulses from said clock means;
said counting means generating a break-loose emergency signal upon reaching a predetermined count of said clock pulses.

9. The apparatus of claim 8 wherein said counting means further comprises:
means for adjusting said predetermined count; and
means coupled to said adjusting means for generating a binary signal for adjusting said predetermined count, said binary signal having a binary code format comprised of a plurality of binary bits.

10. Apparatus for identifying a break-loose condition in a robotic system, said means for comparing comprising:
a stator surface;
at least one robot movable within a predetermined workspace along said stator surface responsive to motor step pulses and direction signals;
means for controlling the movement of said robot according to a predetermined command value;
acceleration detection means provided on said robot;
difference means for generating a difference value representing the difference between the command value and the actual acceleration sensed by said acceleration detection means;
means for comparing said difference value with a predetermined threshold level, said comparison means including means for generating a break-loose signal when said threshold level has been exceeded;
means for timing the duration of said break-loose signal including means for generating a system break-loose emergency signal when said break-loose signal has persisted for a predetermined time interval;
first and second comparators for comparing said difference signal against first and second reference levels which establish the safe limits for a difference signal;
said comparators generating a break-loose signal when said difference signal falls outside of its associated safe limit; and
said timing means having an enabling input means for coupling the outputs of said comparators to said timing means enabling input.

11. Apparatus for identifying a break-loose condition in a robotic system comprised of:
a stator surface;
at least one robot movable within a predetermined workspace and along said stator surface responsive to step pulses and a direction signal;
means for commanding the acceleration in mutually perpendicular directions of said robot according to a predetermined command value;
first and second acceleration detection means provided on said robot for detecting acceleration in said mutually perpendicular directions;
first and second difference means for respectively generating a difference value representing the difference between the command value and the actual acceleration sensed by said first and second acceleration detection means in each of said mutually perpendicular directions;
means for comparing each of said difference values with predetermined threshold levels representing safe limits for each of said mutually perpendicular directions, said comparison means including means for generating a break-loose signal when the safe limit of at least one of said mutually perpendicular directions has been exceeded;
means for timing the duration of said break-loose signal including means for generating a break-loose emergency system when said break-loose signal has persisted for a predetermined time interval.

12. The apparatus of claim 11 further comprising:
means responsive to a break-loose emergency signal for removing all driving power from the robots in the system.

13. A method for monitoring a robot in a robot system for the potential of being damaged or misaligned and from damaging other objects within the work place, said robot being movable along a stator surface and in a common workspace populated by other robots and objects within the workplace, each robot having a driving motor means for moving the robot along said stator surface which is a substantially flat surface, said method comprising the steps of:
establishing the safe limits of linear acceleration of a robot preparatory to commanding the movement of said robot according to the commanded acceleration and weight of the robot;
applying a command signal to said motor means for commanding the movement of a robot;
determining the actual linear acceleration of the commanded robot;

determining the difference between said command signal and said actual acceleration; and determining if the difference signal falls within said safe limits.

14. The method of claim 13 further comprising the steps of:

generating a break-loose signal when said difference signal falls outside of said safe limits;

measuring the length of time that the break-loose signal persists; and generating an emergency interrupt signal if the break-loose signal persists for a period of time greater than a predetermined limit.

15. The method of claim 14 wherein said predetermined limit is preset preparatory to initiating a command signal and is a function of the desired acceleration and the weight of the robot together with any attachment secured thereto.

16. The method of claim 15 further comprising the steps of:

generating clock pulses at a predetermined rate;

counting said clock pulses when said break-loose signal is present; and comparing said count with said predetermined limit for generating said emergency interrupt signal when said count exceeds said predetermined limit.

17. The method of claim 16 further comprising:

maintaining said emergency interrupt signal even in the event that the break-loose signal is no longer present; and removing said emergency interrupt signal responsive to decoupling of all power from all of the robots in the system responsive to an emergency interrupt signal.

18. A method for monitoring a robot in a robot system to determine its potential of being damaged or misaligned and from damaging other objects within the work place, said robot being movable along a stator surface in a common workspace populated by other robots and other fixed obstacles, each robot having a driving motor means for selectively moving the robot in mutually perpendicular directions along said stator surface which is a substantially flat surface, said method comprising the steps of:

establishing the safe limits of acceleration of a robot in each of said mutually perpendicular directions preparatory to commanding the movement of said robot according to the commanded acceleration and weight of the robot;

applying a command signal to said motor means for selectively commanding the movement of a robot in mutually perpendicular directions;

independently determining the actual acceleration of the commanded robot in each of said mutually perpendicular directions;

obtaining a difference value representing the difference between said command signal and said actual acceleration for each of said mutually perpendicular directions; and determining if the difference value for each of said mutually perpendicular directions falls within said safe limits.

19. The method of claim 18 further comprising the steps of:

generating a break-loose signal when said difference signal falls outside of said safe limits;

measuring the length of time that the break-loose signal persists; and generating an emergency interrupt signal if the break-loose signal persists for a period of time greater than a predetermined limit.

20. The method of claim 19 wherein said predetermined limit is preset preparatory to initiating a command signal and is a function of the desired acceleration and the weight of the robot together with any attachment secured thereto.

21. The method of claim 20 further comprising the step of:

generating clock pulses at a predetermined rate;

counting said clock pulses when said break-loose signal is present; and comparing said count with said predetermined limit for generating said emergency interrupt signal, when said count exceeds said predetermined limit.

22. Apparatus for identifying a break-loose condition in a robotic system comprised of:

a stator having a planar surface;

at least one robot movable within a predetermined workspace along said stator planar surface;

said stator surface being formed of a magnetic material having grooves arranged in mutually orthogonal directions to define a pattern of teeth arranged in regular rows and columns;

said robot including two dimensional linear motor means for generating electromagnetic signals cooperating with said stator teeth for moving said robot along said stator surface and within a predetermined workspace;

means for commanding movement of said robot according to a predetermined command value;

first and second acceleration detection means provided on said robot for producing acceleration signals in mutually perpendicular directions responsive to linear acceleration of said robot in associated directions;

difference means for generating a difference value representing the difference between the command value and the actual linear acceleration signals sensed by each of said first and second acceleration detection means;

means for providing predetermined threshold levels representing safe limits for acceleration of said robot in each of said mutually perpendicular directions, said safe limits being a function of the wight of said robot;

difference means for generating a difference value representing the difference between the command value and the actual acceleration value sensed by each of said first and second acceleration detection means;

means for comparing each of said difference values with said predetermined threshold levels; and means responsive to said means for comparing for generating a break-loose signal when its associated safe limit threshold level has been exceeded.

23. The apparatus of claim 22 further comprising:

means for timing the duration of the break-loose signal including means for generating a system break-loose emergency signal when said break-loose signal has persisted for a predetermined time interval.

24. The apparatus of claim 23 further comprising:

means for halting movement of said robot responsive to said system break-loose emergency signal.

* * * * *